(12) United States Patent  
Nakamura

(10) Patent No.: US 6,748,988 B2  
(45) Date of Patent: Jun. 15, 2004

(54) PNEUMATIC TIRE HAVING LUG GROOVES

(75) Inventor: Kouichi Nakamura, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/770,619

(22) Filed: Jan. 29, 2001

(65) Prior Publication Data

US 2002/0056494 A1 May 16, 2002

(30) Foreign Application Priority Data

Feb. 3, 2000 (JP) ........................................ 2000-026766

(51) Int. Cl.$^7$ ........................ B60C 11/113; B60C 11/13; B60C 103/00
(52) U.S. Cl. ............................ 152/209.22; 152/209.12; 152/903
(58) Field of Search ........................ 152/209.12, 209.13, 152/209.18, 209.22, 903, 209.25

(56) References Cited

U.S. PATENT DOCUMENTS

| | | | |
|---|---|---|---|
| D57,948 S | * | 5/1921 | Switzer |
| 1,767,502 A | * | 6/1930 | Anderson |
| D177,233 S | * | 3/1956 | Hawkinson |
| 3,196,920 A | * | 7/1965 | Fishman |
| 3,467,159 A | | 9/1969 | Semonin |
| 5,002,110 A | | 3/1991 | Tsurunaga et al. |

FOREIGN PATENT DOCUMENTS

| | | | |
|---|---|---|---|
| DE | 2904939 | * | 8/1980 |
| JP | 55-36139 | * | 3/1980 |
| JP | 3-193507 | * | 8/1991 |
| JP | 4-228308 | * | 8/1992 |
| JP | 7-172114 | * | 7/1995 |
| WO | WO 98/33669 | | 8/1998 |
| WO | WO 01/39994 | | 6/2001 |

* cited by examiner

Primary Examiner—Steven D. Maki  
(74) Attorney, Agent, or Firm—Sughrue Mion, PLLC

(57) ABSTRACT

A pneumatic tire having a tread pattern is provided, in which occurrence of uneven wear observed in a conventional lug-type tread pattern can be prevented without causing degradation in the various characteristics of the tire. The pneumatic tire having a tread pattern in which main lug grooves are disposed in the opposing tread shoulder regions at a predetermined pitch in the circumferential direction of the tire. The main lug grooves are so arranged as to provide circumferential phase difference between the opposing tread shoulder regions. In this construction, a narrow shallow groove is disposed in the central region of the tread portion in the tread width direction for connecting the main lug grooves located in the opposing tread shoulder regions, and a shallow groove portion is formed in the shoulder end region inside the main lug groove.

5 Claims, 2 Drawing Sheets

PNEUMATIC TIRE HAVING LUG GROOVES

BACKGROUND OF THE INVENTION

1. Field of the Invention

The present invention relates to an improvement on the tread pattern of a pneumatic tire, and more particularly to a pneumatic tire for use in construction or industrial vehicles that has a tread pattern in which uneven wear resistance can be enhanced without causing degradation in the various characteristics of the tire.

2. Description of the Related Art

In general, in a pneumatic radial tire for use in construction or industrial vehicles, as shown in FIG. 3, main lug grooves 2 are disposed in the opposing shoulder regions of a tread portion 1 at a predetermined pitch in the circumferential direction of the tire. The main lug grooves 2 are so arranged as to provide circumferential phase difference between the opposing tread shoulder regions.

Such a lug-type tread pattern is excellent in driving force, braking force, and particularly tractive force when operated on an unpaved road. Therefore, it is customarily employed as a tread pattern in a pneumatic tire for use in construction and industrial vehicles.

In a pneumatic tire having a conventional tread of a lug-type pattern, however, the opposing tread shoulder portions tend to wear more rapidly than the tread center portion, which results in occurrence of uneven wear. There has thus far been found no satisfactory solution to prevent such occurrence of uneven wear.

SUMMARY OF THE INVENTION

In view of the foregoing problems, an object of the present invention is to provide a pneumatic tire having a tread pattern in which occurrence of uneven wear as seen in a conventional lug-type tread pattern can be prevented without causing degradation in the various characteristics of the tire.

To solve the above-described problem, the present inventor carried out extensive research of a lug-type tread pattern and finally found that the above-mentioned object can be achieved by disposing a narrow shallow groove in the central region of the tread portion in its width direction for connecting the main lug grooves located in the opposing tread shoulder regions, and by forming a shallow groove portion in the shoulder end region of the main lug groove. The present invention has been accomplished based on this novel finding.

That is, according to the present invention, there is provided a pneumatic tire having a tread pattern in which main lug grooves are disposed in the opposing tread shoulder regions at a predetermined pitch in the circumferential direction of the tire, the main lug grooves being so arranged as to provide circumferential phase difference between the opposing regions. In the pneumatic tire, a narrow shallow groove is disposed in the central region of the tread portion in its width direction for connecting the main lug grooves located in the opposing tread shoulder regions, and a shallow groove portion is formed in the shoulder end region inside the main lug groove.

In the construction of the present invention, it is preferable that the groove depth of the narrow shallow groove be set in a range of 15 to 30% of the groove depth of the main lug groove, that the region in which the narrow shallow groove is arranged be set in a range of 20 to 40% of the tread width, and that the groove width of the narrow shallow groove be set in a range of 35 to 100% of the groove width of the main lug groove. Moreover, it is preferable that the groove depth of the shallow groove portion inside the main lug groove be set in a range of 50 to 80% of the groove depth of the main lug groove, and that the region in which the shallow groove portion is formed inside the main lug groove be set in a range of 20 to 50% of the groove length of the main lug groove extending from the tread end to the tread center.

In a pneumatic tire having a lug-type tread pattern, the tread shoulder region tends to wear more rapidly than the tread center region. This is due to the input difference of inputs between the shoulder and center portions, specifically, the input value for the shoulder portion is found to be larger than that for the center portion. Accordingly, in the present invention, in order to the wear to be distributed uniformly, the circumferential rigidities of the tread center and shoulder portions are optimized, that is, the tread center portion is made to have lower rigidity, and, in contrast, the tread shoulder portion is made to have higher rigidity. In this way, it is possible to successfully prevent occurrence of uneven wear as seen in a conventional lug-type tread pattern, which has thus far been difficult to be prevented sufficiently.

BRIEF DESCRIPTION OF THE DRAWINGS

FIG. 3 is a partial unfolded view illustrating the tread surface of the tread employed in a conventional pneumatic tire.

DESCRIPTION OF THE PREFERRED EMBODIMENTS

Hereinafter, embodiments of the present invention will be described with reference to the accompanying drawings.

Figure 1:
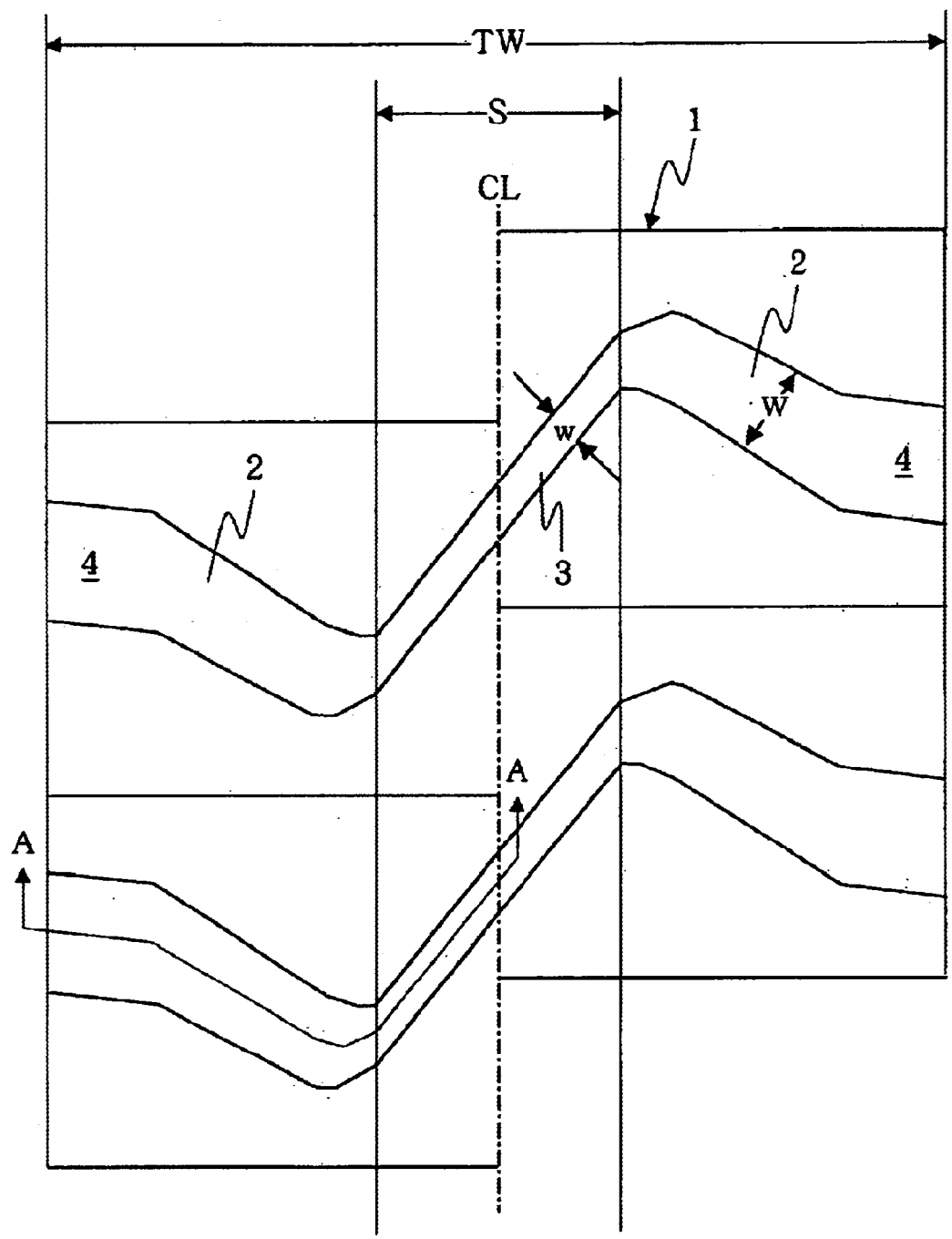
FIG. 1 is a partial unfolded view illustrating the tread surface of the tread employed in the pneumatic tire of an embodiment of the present invention.

FIG. 1 is a partial unfolded view illustrating the tread surface of the tread portion 1 employed in the pneumatic tire of an embodiment of the present invention. The tread portion 1 shown in FIG. 1 of the pneumatic tire taken as a preferred example of the present invention has, in its opposing tread shoulder regions, main lug grooves 2 disposed at a predetermined pitch in the circumferential direction of the tire.

The main lug grooves 2 are so arranged as to provide circumferential phase difference between the opposing tread shoulder regions. There is no specific restriction set as to the shape, dimension, pitch, and circumferential phase difference of the main lug groove 2, and thus it may be made equal to the main lug groove of conventionally-known lug-type tread patterns described just above.

Figure 2:
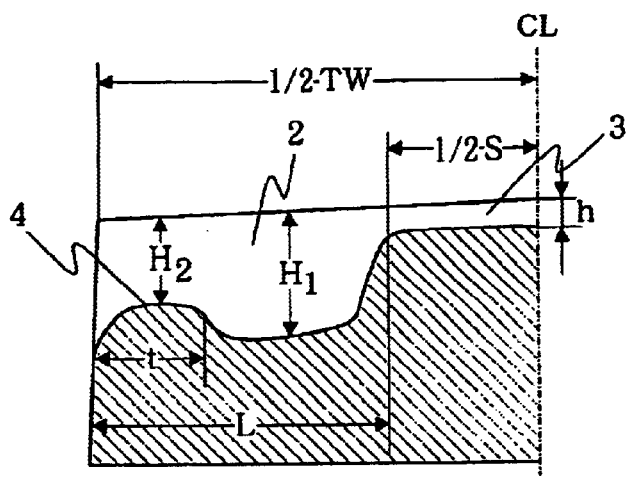
FIG. 2 is a sectional view illustrating the same construction taken along a line A—A of FIG. 1.
Figure 2:
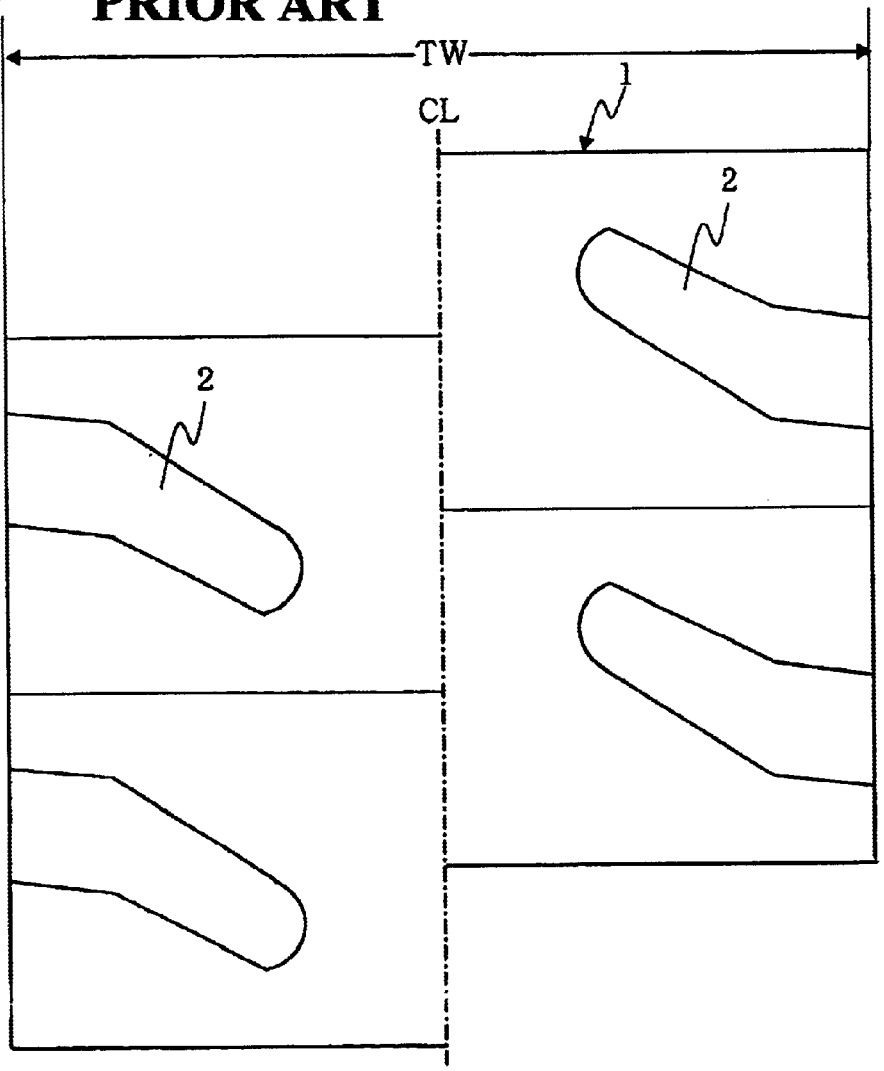

According to the present invention, in the central region S of the tread portion in the tread width (TW) direction is disposed a narrow shallow groove 3 for connecting the main lug grooves 2 located in the opposing tread shoulder regions. Disposing the narrow shallow groove 3 helps reduce the rigidity of the tread center portion S. The groove depth h of the narrow shallow groove 3 is preferably set in a range of 15 to 30%, more preferably, 20 to 25% of the groove depth $H_1$ of the main lug groove 2 (refer to FIG. 2 illustrating the sectional profile of the construction taken along a line A—A of FIG. 1). This is because, the depth h of less than 15% leads to insufficient reduction in the rigidity of the tread center portion, and, in contrast, the depth h exceeding 30% leads to undesirable reduction in the rigidity of the tread portion as a whole. Moreover, the region S in which the narrow shallow groove 3 is arranged is preferably set in a range of 20 to 40%, more preferably, 25 to 30% of the tread width (TW). This is because, the arrangement region S of less than 20% leads to insufficient reduction in the rigidity of the tread center portion, and, in contrast, the arrangement region S exceeding 40% leads to undesirable increase in the rigidity of the tread shoulder portion. Furthermore, the groove width w of the narrow shallow groove 3 is preferably set in a range of 35 to 100%, more preferably, 40 to 60% of the groove width W of the main lug groove 2. This is because, the groove width w of less than 35% leads to insufficient reduction in the rigidity of the tread center portion, and, in contrast, the groove width w exceeding 100% leads to undesirable reduction in the rigidity of the tread portion as a whole.

Moreover, according to the present invention, in the shoulder end region of the main lug groove 2 is formed a shallow groove portion 4. The formation of the shallow groove portion 4 helps increase the rigidity of the shoulder portion. The groove depth $H_2$ of the shallow groove portion 4 is preferably set in a range of 50 to 80%, more preferably, 70 to 80% of the groove depth $H_1$ of the main lug groove 2. The depth $H_2$ of less than 50% leads to insufficient increase in the rigidity of the shoulder portion, and, in contrast, the depth $H_2$ exceeding 80% leads to deterioration in the characteristics of the lug-type tread pattern, such as driving force, braking force, and tractive force. Moreover, the region t in which the shallow groove portion 4 is formed inside the main lug groove 2 is preferably set in a range of 20 to 50%, more preferably, 30 to 40%, of the groove length L of the main lug groove extending from the tread end to the tread center CL (refer to FIG. 2). The region t of less than 20% leads to insufficient increase in the rigidity of the shoulder portion, and, in contrast, the region t exceeding 50% leads to, just as in the above case, deterioration in the characteristics of the lug-type tread pattern, such as driving force, braking force, and tractive force.

It should be noted that the main development of the pneumatic tire of the present invention have been concentrated into improvement on the tread pattern, and thus the other configuration, materials, and the like are not limited to those described in the above descriptions and their design can follow conventional practice. Accordingly, it is possible to employ, as preferable examples, the configuration, materials, and the like employed in conventional pneumatic radial tires for use in construction or industrial vehicles.

Now, the present invention will be further clarified based on a practical example.

EXAMPLES

A pneumatic radial tire (size: 18.00R25) having a tread of a lug-type pattern was manufactured in the following manner. As shown in FIG. 1, a narrow shallow groove 3 was disposed in the central region S of the tread portion in the tread width direction for connecting the main lug grooves 2 located in the opposing tread shoulder regions, and a shallow groove portion 4 was formed in the shoulder end region of the main lug groove 2. Here, the groove depth h of the narrow shallow groove 3 was set to be 23% of the groove depth $H_1$ of the main lug groove 2, the arrangement region S was set to be 25% of the tread width TW, and the groove width w was set to be 40% of the groove width W of the main lug groove 2. Moreover, the groove depth $H_2$ of the shallow groove portion 4 was set to be 74% of the groove depth $H_L$ of the main lug groove 2, and the formation region t was set to be 32% of the groove length L of the main lug groove.

Conventional Example

A pneumatic radial tire (size: 18.00R25) having a tread of a conventional lug-type pattern as shown in FIG. 3 was manufactured. This tire was constructed basically in the same manner as that of the Example described just above except that, in the former, neither the narrow shallow groove 3 nor the shallow groove portion 4 was provided.

The tires of the Example and the Conventional Example were installed on an actual motor vehicle and the vehicle was driven on a paved road, then, after 1000 hours running, variations in groove depth observed in each of the tread center portion and the tread shoulder portion were measured. Assuming that the amount of uneven wear is represented by an index based on the tire of the Conventional Example being 100, that measured for the tire of the Example was indicated by 50. That is, it has been experimentally confirmed that the amount of the uneven wear observed in the Example according to the present invention is reduced by half.

As described heretofore, in the pneumatic tire, more particularly, the pneumatic tire for use in construction or industrial vehicles, of the present invention, a narrow shallow groove is disposed in the central region of the tread portion in the tread width direction for connecting the main lug grooves located in the opposing tread shoulder regions, and a shallow groove portion is disposed in the shoulder end region of the main lug groove. In this way, occurrence of uneven wear particularly observed in a lug-type tread pattern can be successfully prevented without causing degradation in the various characteristics of the tire.

What is claimed is:

1. A pneumatic tire having a tread pattern in which main lug grooves are disposed in opposing shoulder regions of a tread portion at a predetermined pitch in a circumferential direction of a tire, the main lug grooves being so arranged as to provide circumferential phase difference between the opposing tread shoulder regions, wherein the main lug grooves are inclined with respect to the tread width direction and have the same inclining direction in the opposing shoulder regions, wherein a narrow shallow groove inclined in the opposite direction with respect to each main lug groove is disposed in a central region of the tread portion in its width direction for connecting each main lug groove located in the opposing tread shoulder regions, wherein a groove depth of the narrow shallow groove is set in a range of 15 to 30% of a groove depth of the main lug groove, wherein a groove width of the narrow shallow groove is set in a range of 35 to 60% of groove width of the main lug groove, and wherein a shallow groove portion is formed in a shoulder end region inside each main lug groove.

2. The pneumatic tire according to claim 1, wherein a region in which the narrow shallow groove is arranged is set in a range of 20 to 40% of width of the tread portion.

3. The pneumatic tire according to claim 1, wherein groove depth of the shallow groove portion inside the main lug groove is set in a range of 50 to 80% of groove depth of the main lug groove.

4. The pneumatic tire according to claim 1, wherein a region in which the shallow groove portion is formed inside the main lug groove is set in a range of 20 to 50% of groove length of the main lug groove extending from tread end to tread center of the tread portion.

5. The pneumatic tire according to claim 1, wherein each of the main lug grooves has a bending point.

* * * * *